_United States Patent Office_

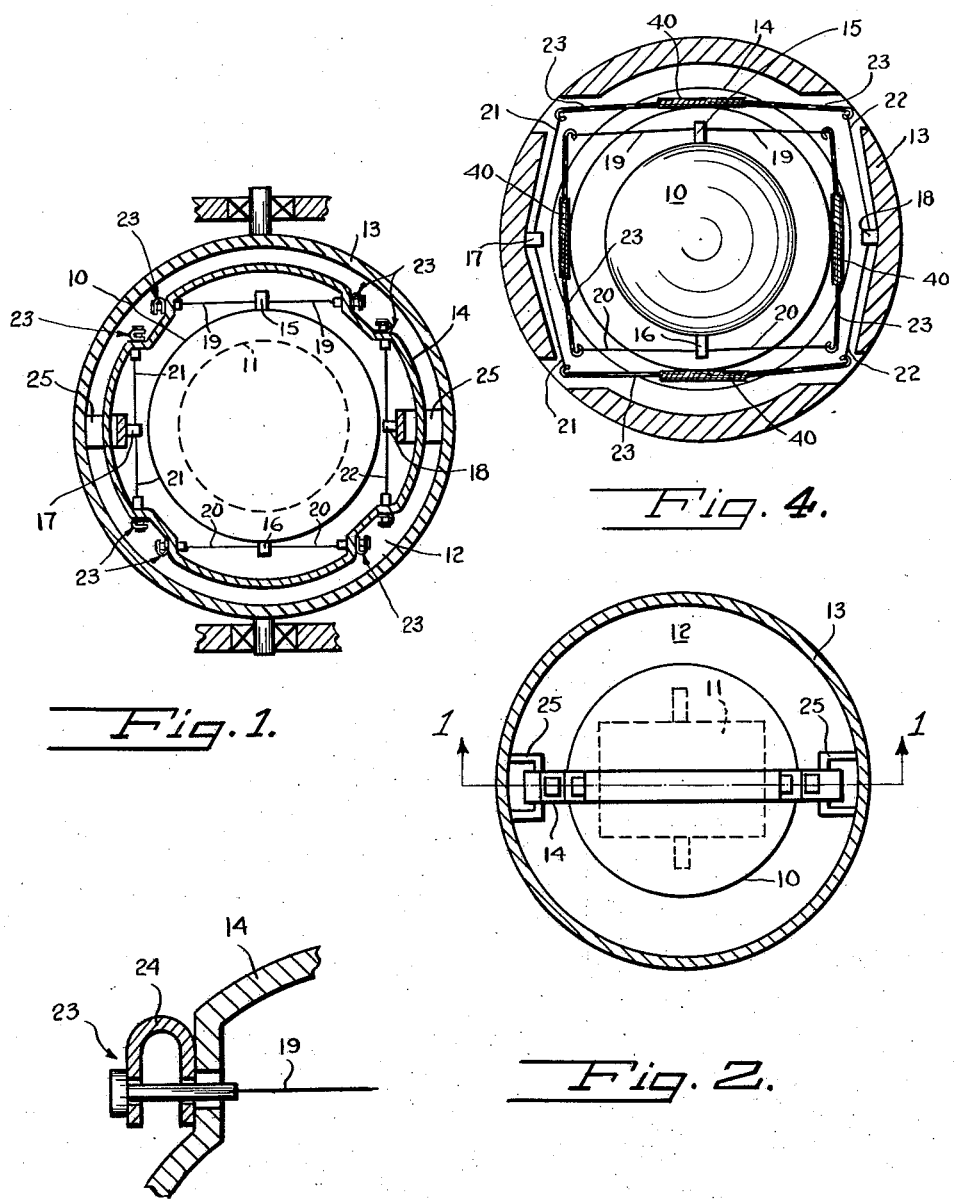

3,002,392
Patented Oct. 3, 1961

3,002,392
GYROSCOPE SUSPENSION
Dominik P. Scotto, Plainview, N.Y., assignor to American Bosch Arma Corporation, a corporation of New York
Filed May 20, 1959, Ser. No. 814,460
7 Claims. (Cl. 74—5)

The present invention relates to fluid supported gyroscopes and has particular reference to wire suspension means therefor.

Wire suspensions for fluid supported gyros are generally required to assure centering of the gyro since absolute neutral buoyancy is impossible to attain, and to prevent translational motion of the substantially buoyant gyroscopic float.

Prior wire suspensions for this purpose are described in U.S. Patent 2,677,194 and copending U.S. patent application S.N. 479,144, filed Dec. 31, 1954, for Gyrocompass, assigned to the assignee of this application. These suspensions use tensioned wires between the gyro casing and its gimbal ring, and between the gimbal ring and the fluid containing tank, in which the wires are substantially radially disposed with respect to the gyro spin axis and when taken together can be visualized in the form of a cross. This is effectively shown in U.S. Patent 2,740,299 where the gimbal ring is actually eliminated by reducing it in diameter until it is merely a central support located at the spin axis of the gyro and the tension wires extend at right angles from this support. Under relative angular displacement between the members connected by the tension wires, the wires are placed under torsional stress.

The present invention discards the use of the radial suspension wires in favor of transversely extending tension wires which may be compared to end-supported beams.

In accordance with this invention, four thin wires or tapes are stretched over a gimbal ring to form a quadrangle, preferably a rectangle or square. The gyro float is anchored to one pair of wires, while the gyro tank is anchored to the other pair of wires. Under relative angular displacement between the members connected by the tensioned wire, the wire is subjected to a flexural stress.

It can be shown that the torsional restraint characteristic of this suspension is essentially a function of the tension in the wires and a relatively small portion is a function of the bending of the wires. Therefore, the tension loading can be designed to minimize the effects of hysteresis without compromising the rest of the design. It follows that shape and size of the wires are not extremely critical thereby easing the manufacture of the suspension.

In addition, proper tension loading will produce a nearly iso-elastic suspension, thereby significantly reducing one cause of gyro drift when subjected to vibration and acceleration.

Furthermore, efficient packaging of the gyro is permitted by the present invention, resulting in a relatively compact and uncomplicated structure.

For a more complete understanding of the present invention, reference may be had to the accompanying diagrams in which:

FIG. 1 is a cross sectional view of a suspension according to the present invention, with the cutting plane passing through 1—1 of FIG. 2;

FIG. 2 is a view of the interior of the tank;

FIG. 3 is a detail of the tension loading means; and

FIG. 4 is a cross sectional view of another embodiment of the invention.

With reference now to FIG. 1 of the drawings there is shown a cross sectional view of the fluid suspended gyro in which a ball 10 supporting a gyro wheel 11 is suspended in substantial neutral buoyancy in a fluid 12 confined within the outer gimbal ring or tank 13. Interposed between the ball 10 and the tank 13 is an inner gimbal ring 14, in which the ball 10 is pivoted about an axis through shafts 15, 16 and which itself is pivoted about an axis through pivots 17, 18 which are secured to brackets 25 on the inner surface of tank 13.

Stretched between each pivot 15, 16, 17 and 18 and the gimbal ring 14 are the respective wires 19, 20, 21, 22 which, taken together, form a quadrangle with the pivot points at the center of each side. Thus, the shaft 15 is attached to the center of wire 19 and the ends of the wire are anchored to the gimbal ring 14 through some type of tension loading device 23. For example, a coil spring or leaf spring 24 as shown in FIG. 3 may be used or the device 23 may be made adjustable, if desired, in order to be able to apply a predetermined preload to the tension wire 19. In a similar manner, shaft 16 is attached to the center of wire 20, pivot 17 is attached to the center of wire 21 and pivot 18 is attached to the center of wire 22.

It will be seen that the wires 19, 20 restrict motion of the ball 10 within the gimbal ring 14 to rotational motion about the axis through shafts 15, 16 and that the wires 21, 22 restrict motion of the gimbal ring 14 within the tank 13 to rotational motion about the axis through pivots 17, 18.

The restraint to these rotations is primarily a function of the tension in the wires and to a lesser extent depends upon the bending effects experienced by the wires at the pivot points. This will permit design of the tensioning device 23 to minimize the effects of hysteresis without deterioration of the rest of the design and it follows that the shape and size of the wires 19-22 do not have to be controlled to extreme accuracy, thereby resulting in a suspension of relatively simple manufacture.

In addition, the tensioning device 23 can be designed to make the suspension substantially iso-elastic, thereby reducing the gyro drift under vibration and acceleration.

For example, the suspension can be made iso-elastic by designing the tensioning spring 24 so that its spring rate in the direction of applied tension is equal to the spring rate of the support wire in the plane transverse to the support wire at the pivots 15, 16, 17, 18. If this is done, it will be seen that the spring rates of the support system along the three major axes will be equal. Since the spring rate of the tensioning spring is a function of the physical design of the spring, and the tension required is a function of the initial preload on the spring, the manufacture of such springs is relatively simple.

FIG. 4 illustrates another embodiment of the invention. In FIG. 4 the ends of the tensioned members or wires 19, 20, 21 and 22 are attached to the spring means 23 which comprise cantilever beams emanating from supports 40 which are anchored to the gimbal ring 14. The supports 40 are preferably rigidly secured to two flat rings, with the composite assembly making up the gimbal ring 14. Also, means, not shown, may be provided on the supports 40 to adjust the position of the springs 23 to thereby regulate the tension in the wires 19 through 22 and the position of the ball 10.

I claim:

1. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged substantially quadrilaterally between said outer gimbal ring and said gyroscope and having the ends of said tension members connected to said inner gimbal ring, means for connecting said gyroscope casing to the substantial center of a pair of oppositely disposed tension members and means for connecting said outer gimbal ring to the substantial center of the other pair of oppositely disposed tension members.

2. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged quadrilaterally in said inner gimbal ring, means for connecting said gyroscope casing to the substantial center of a pair of oppositely disposed tension members and means for connecting said outer gimbal ring to the substantial center of the other pair of oppositely disposed tension members, and means adjacent the ends of each of said tension members for controlling the tension therein.

3. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged quadrilaterally in said inner gimbal ring, means for connecting said gyroscope casing to the substantial center of a pair of oppositely disposed tension members and means for connecting said outer gimbal ring to the substantial center of the other pair of oppositely disposed tension members, and resilient means adjacent the ends of each of said tension members for controlling the tension therein.

4. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged quadrilaterally in said inner gimbal ring, means for connecting said gyroscope casing to the substantial center of a pair of oppositely disposed tension members and means for connecting said outer gimbal ring to the substantial center of the other pair of oppositely disposed tension members, said gyroscope casing and said inner gimbal ring being suspended in neutral buoyancy in a suspending fluid.

5. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged substantially quadrilaterally between said outer gimbal ring and said gyroscope and having the ends of said tension members connected to said inner gimbal ring, means for connecting said gyroscope casing to the substantial center of a pair of oppositely disposed tension members and means for connecting said outer gimbal ring to the substantial center of the other pair of oppositely disposed tension members and means adjacent the ends of each of said tension members for controlling the tension therein.

6. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged substantially quadrilaterally between said outer gimbal ring and said gyroscope and having the ends of said tension members connected to said inner gimbal ring, means for connecting said gyroscope casing to the substantial center of a pair of oppositely disposed tension members and means for connecting said outer gimbal ring to the substantial center of the other pair of oppositely disposed tension members and resilient means adjacent the ends of each of said tension members for controlling the tension therein.

7. In a device of the character described, an outer gimbal ring, an inner gimbal ring within said outer gimbal ring, a gyroscope casing adapted to contain a gyroscope, suspension means for suspending said gyroscope casing and said inner gimbal ring in said outer gimbal ring, said suspension means including tension members arranged substantially quadrilaterally between said outer gimbal ring and said gyroscope and having the ends of said tension members connected to said inner gimbal ring, means for connecting said gyroscope casing to the substantial center of a pair of oppositely disposed tension members and means for connecting said outer gimbal ring to the substantial center of the other pair of oppositely disposed tension members, said gyroscope casing and said inner gimbal ring being suspended in neutral buoyancy in a suspending fluid.

References Cited in the file of this patent
UNITED STATES PATENTS

| 2,687,647 | Ashworth et al. | Aug. 31, 1954 |
| 2,740,299 | Jewell | Apr. 3, 1956 |
| 2,746,301 | Henderson | May 22, 1956 |